E. B. Requa,
Horse Power,
No. 27,928. Patented Apr. 17, 1860.

Witnesses:
William Thompson
Chas. Crux

Inventor:
E. B. Requa

UNITED STATES PATENT OFFICE.

E. B. REQUA, OF JERSEY CITY, NEW JERSEY.

HORSE-POWER.

Specification of Letters Patent No. 27,928, dated April 17, 1860.

*To all whom it may concern:*

Be it known that I, E. B. REQUA, of Jersey City, in the county of Hudson and State of New Jersey, have invented a new and Improved Horse-Power; and I do hereby declare that the following is a full, clear, and exact description of the same, reference being had to the accompanying drawing, forming a part of this specification, in which—

Figure 1:
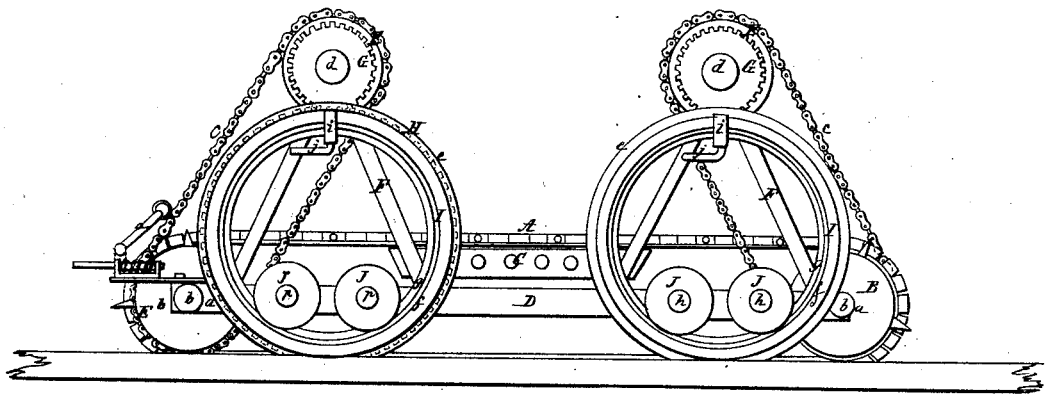
Figure 2:
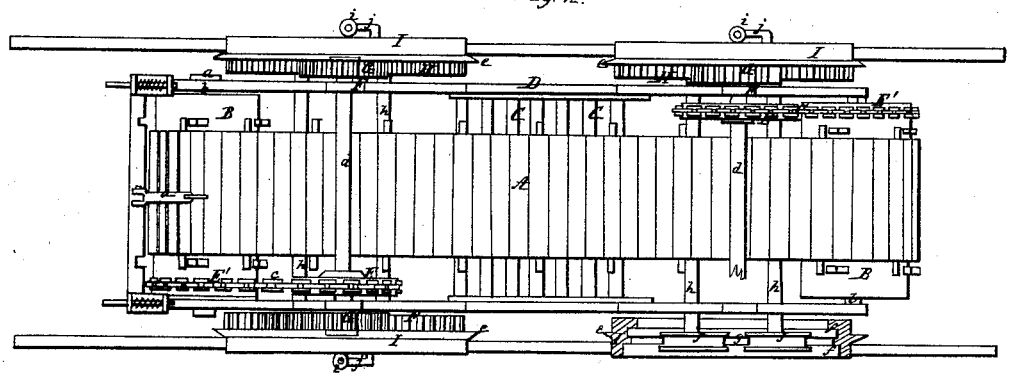

Figure 1 represents a side elevation of my invention, applied to driving a rail-road car. Fig. 2 a plan or top view of the same.

Similar letters of reference indicate corresponding parts in both figures.

This invention consists of a certain arrangement of chain wheels, cog wheels, and grooved rollers in combination with one or more loose rims of a peculiar form as will be hereinafter more fully explained and with an endless apron running over a roller-platform in such a manner that a horse traveling on said endless apron, imparts a rotary motion to said rims, which when applied to a rail-road car take the place of the driving wheels, or when intended to drive some other machinery, one of said rims takes the place of the driving pulley.

To enable those skilled in the art to make and use my invention I will proceed to describe its construction and operation, with reference to the drawing.

A represents an endless apron covered with planks or boards and running over pulleys B, which may be furnished with spikes in order to prevent the apron from slipping. The middle portion of the apron is supported by a roller platform C, and the pulleys B, are arranged in a frame or platform D, one end of which bears the hinged arm $a'$, that serves to hitch on the horse. The pulleys B, are secured to shafts $b$, which have their bearings in suitable standards or boxes $a$, attached to the frame or platform D, and belt or chain wheels E' are attached to the pulleys B, either on one or on both sides of the apron A. Chains $c$, extend from said chain wheels over pulleys or chain wheels E, which are secured to shafts $d$, that have their bearings in standards F, on either side of the platform or frame D. Cogwheels C, which are secured to the ends of the shafts D, gear into toothed hollow rings H which are attached to the rims I, as clearly shown in Fig. 2, in the drawings. These rims are furnished with flanges $e$, in the manner of common car-wheels, if my device is intended to be used for propelling a railroad car, but if it is intended as a common horse power, one of said rims is sufficient and it is turned off smooth to serve as a common belt-wheel. The inside of said rims is provided with annular grooves $f$, and a projection $g$, to correspond to the surface of the grooved rollers J, which are secured to the ends of arbors $h$, that have their bearings in the frame D. These rollers serve to keep the rings in their places, and guide rollers $i$ secured to arms $j$, that extend from the standards F, serve to keep the upper part of said rims in gear with the cogwheels G.

If a horse is placed on the endless apron A, and hitched to the arm $a'$, the several rollers and wheels begin to rotate in the direction of the arrows marked on them, and a rotary motion is imparted to the hollow rims I, through the agency of the chain wheels E', and chains $c$, cogwheels G, and toothed rings H, and the hollow rims I, take the place of the driving wheels propelling the car on the road.

When the device is to be applied to drive machinery, the whole is turned upside down so that the hollow rims I are suspended from the grooved rollers J, and instead of giving to said rims the usual form of the rims of car wheels, they now take the place of common belt wheels or pulleys, from which the motion is transmitted to the working machines in any convenient manner. It is obvious that in the latter case, the roller-platform, which supports the middle portion of the endless apron A is to be reversed, so that it now supports the opposite portion of the apron and the arm $a'$ has to be attached to that side of the frame D, which is represented as the underside in the drawing.

What I claim as new, and desire to secure by Letters Patent is,

The arrangement of the hollow rims I, in combination with the toothed rings H, cogwheels G, chains $c$, chainwheels E, and E', and endless apron A constructed and operating substantially as and for the purpose specified.

E. B. REQUA.

Witnesses:
WILLIAM THOMPSON,
CHAS. CRUX.